United States Patent
Lenehan

[15] 3,654,483
[45] Apr. 4, 1972

[54] APPARATUS FOR TRANSFERRING INTELLIGENCE BETWEEN TWO VOLTAGE LEVELS

[72] Inventor: Bernard E. Lenehan, Bloomfield, N.J.
[73] Assignee: Westinghouse Electric Corporation, Pittsburgh, Pa.
[22] Filed: Feb. 6, 1970
[21] Appl. No.: 9,371

[52] U.S. Cl..............................307/109, 323/44 R, 324/118, 324/126, 333/32
[51] Int. Cl...............................G01r 19/26, G01r 15/06
[58] Field of Search..................307/109; 323/93, 44 R, 128; 333/77, 15, 32; 324/118, 126, 127

[56] References Cited

UNITED STATES PATENTS

| | | | |
|---|---|---|---|
| 2,341,519 | 2/1944 | Atkinson | 307/109 |
| 2,116,600 | 5/1938 | Fisher | 333/15 X |
| 1,547,242 | 7/1925 | Strieby | 307/109 X |
| 3,419,792 | 12/1968 | Kasper | 323/128 X |

Primary Examiner—Bernard Konick
Assistant Examiner—Stuart Hecker
Attorney—A. T. Stratton, C. L. Freedman and John L. Stoughton

[57] ABSTRACT

An apparatus for transferring intelligence such as current magnitude from a high potential conductor to ground potential through the capacitive effect of a coupler to eliminate the necessity of providing sufficient insulation in the current transducer to withstand the high potential difference between that of the conductor and that of ground.

12 Claims, 5 Drawing Figures

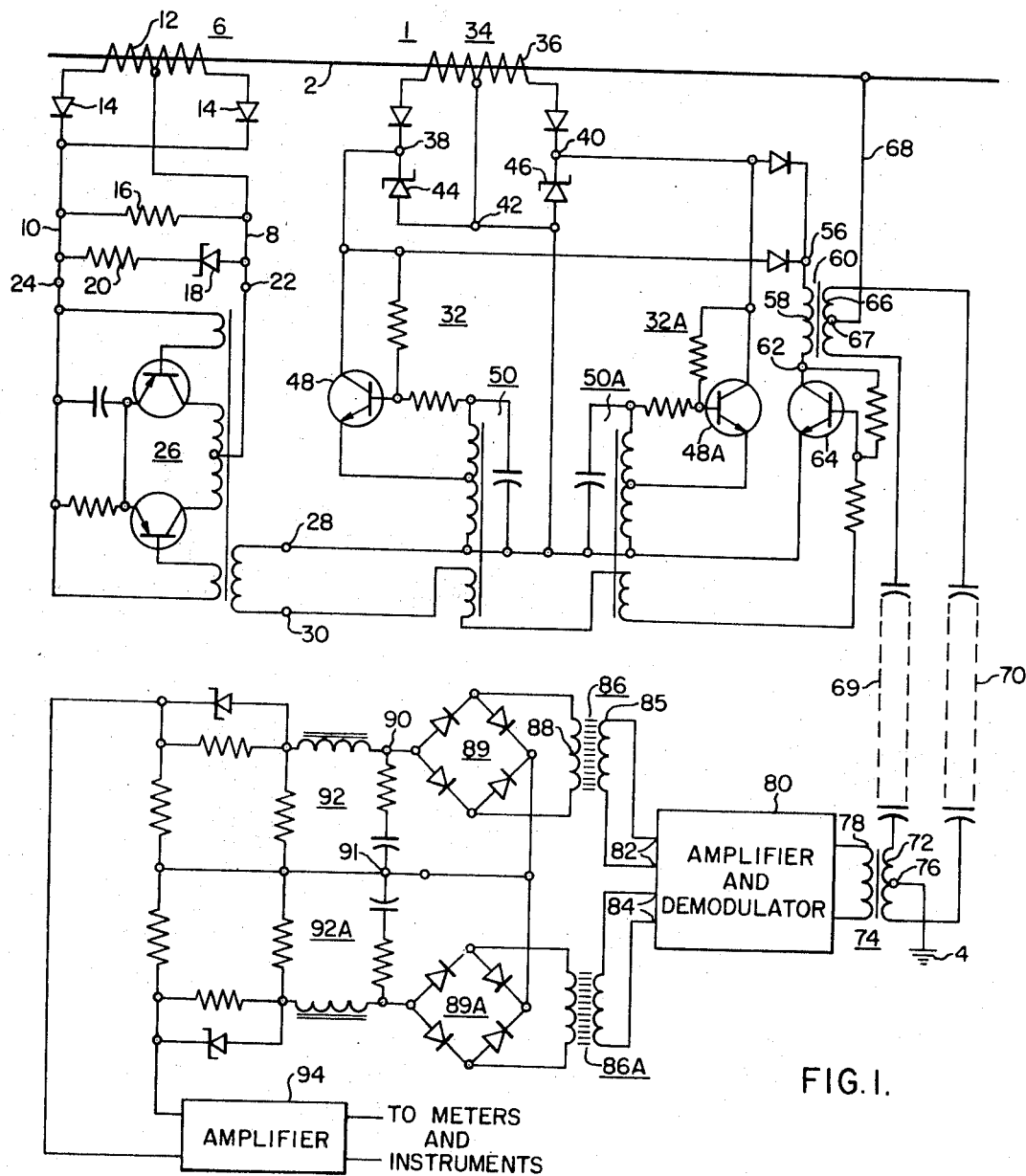
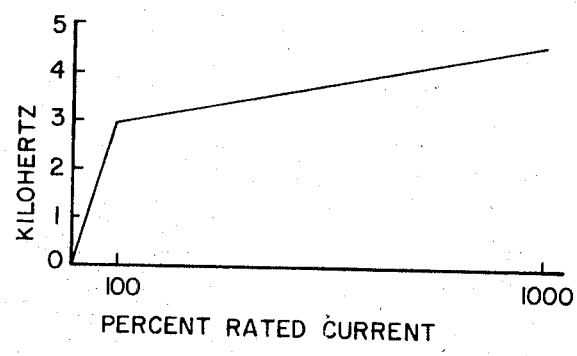
FIG. 1.
FIG. 2.
INVENTOR
Bernard E. Lenehan
BY John L. Stoughton
ATTORNEY 3,654,483

APPARATUS FOR TRANSFERRING INTELLIGENCE BETWEEN TWO VOLTAGE LEVELS

BACKGROUND OF THE INVENTION

As the magnitude of the voltage in a power transmitting line increases, the cost of providing the usual current signal at safe potentials for use at ground potential by means of a properly insulated transformer which is capable of withstanding the ground to power line voltage becomes increasingly more costly and the cost of obtaining the current signal for relaying purposes becomes a greater and greater proportion of the total magnitude of the relaying apparatus. In accordance with this invention the need for such a costly current transformer is eliminated.

In most relaying systems of the phase comparison type, in which the current condition at the remote station is transmitted to the local station as by means of a carrier current superimposed on one of the transmission lines, there is normally provided a coupling capacitor at each end of the protected sections of the line. These coupling capacitors are connected between the conductor, over which the intelligence is transmitted, and ground and form a part of the carrier current circuit. I propose to connect a second capacitor or coupler in parallel with the usual capacitor or coupler. The two couplers are connected at one end to the end terminals of one winding of a first inductive device, shown as a transformer winding having a center tap and the center tap is connected to the high voltage conductor. The other end of the couplers are connected to the end terminals of one winding of a second inductive device which may be a transformer winding having a center tap connected to ground. A transmitter deriving its power from the high voltage conductor and modulated by the current in the high voltage conductor transmits, through the capacitive effect of the two couplers, a current signal to a receiver coupled to the ground end of the couplers. The use of a pair of coupling capacitors and inductively coupling the two ends together, a signal will always be maintained between the transmitter and receiver irrespective of any faulting of any of the conductors of the high voltage transmission line.

BRIEF DESCRIPTION OF DRAWINGS

FIG. 1, illustrates an apparatus associated with a conductor at high voltage with respect to ground for transferring a current signal from a lightly insulated current transformer via a transmitting device, a signal carrier and a receiver amplifier for supplying line intelligence to apparatus located at substantially ground potential and which apparatus embodies the invention;

FIG. 2 is a curve showing the change in modulating frequency with change in line current of the apparatus of FIG. 1;

DESCRIPTION OF PREFERRED EMBODIMENT

Figure 3:
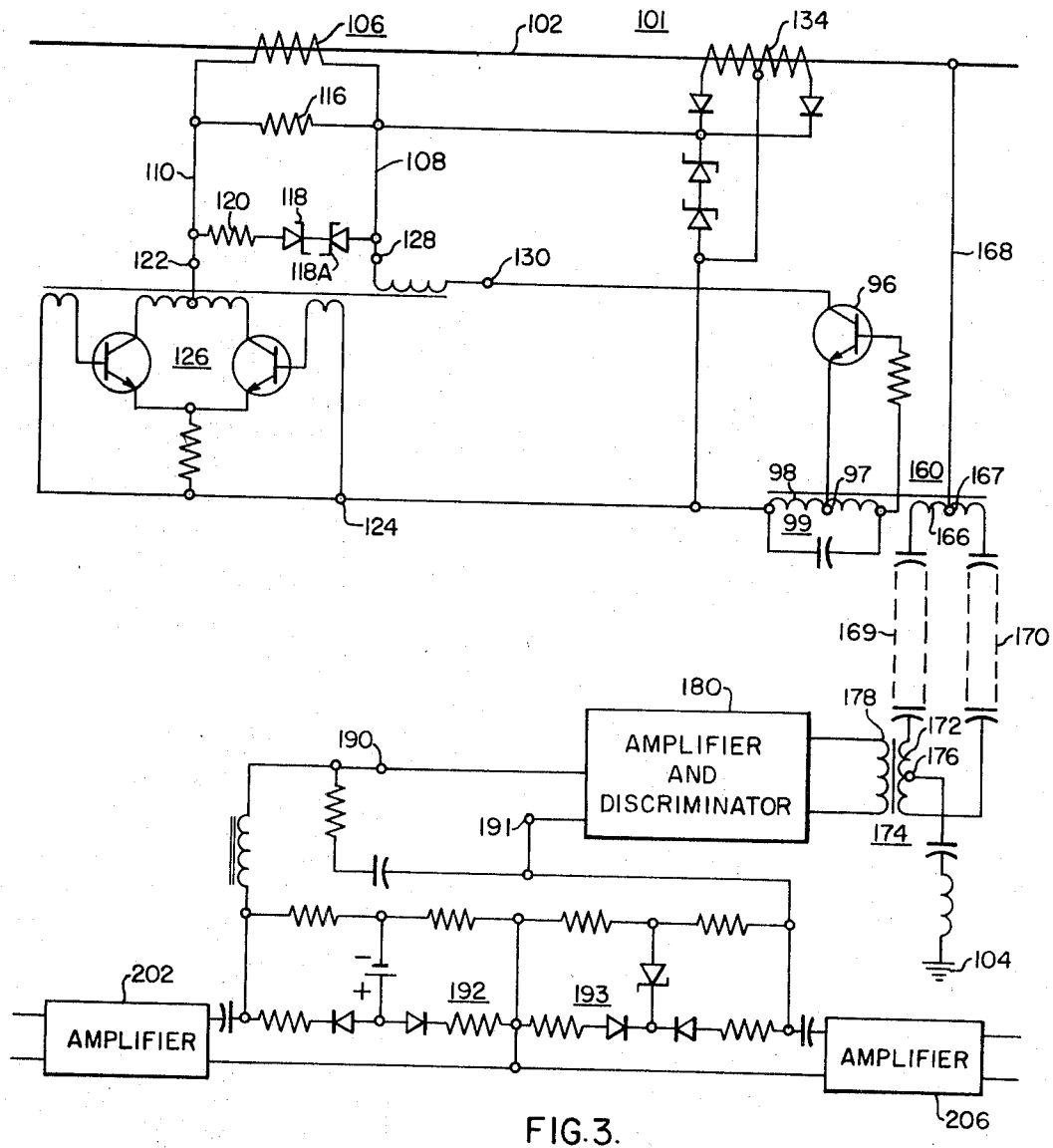
FIG. 3 is a modified form of system as shown in FIG. 1 and also embodying the invention.

Referring to the drawings by characters of reference the numeral 1 indicates a power transmission line having a current conductor 2 maintained at a extra high voltage with respect to the earth or ground 4. A current transformer 6 is associated with the conductor 2 and supplies a potential between a pair of conductors 8 and 10 which varies in accordance with the magnitude of the current in the conductor 2. More specifically the current transformer 6 is provided with a secondary winding having its end terminals connected through rectifying devices 14 to the conductor 10 and a center tap of the secondary winding connected directly to the conductor 8. A resistor 16 is connected between the conductors buses 8 and 10 and establishes a magnitude of voltage between the buses 8 and 10 in accordance with the current flowing in the conductor 2. In order to prevent an abnormal increase in voltage between the conductors 8 and 10 in the event of an abnormally high fault current in the conductor 2, a Zener Diode 18 and a resistor 20 are connected in series between the buses 8 and 10. In accordance with a preferred form of my invention the maximum expected peak current from the winding 12 with a current magnitude in the conductor 2 which is several multiples of the normal load current may be in the order of 50 milliamperes and with the resistance of resistor 16 selected to be 200 ohms the Zener Diode 18 may have a break-over value of 10 volts. A suitable value of resistance of the resistor 20 may be 10 ohms.

The voltage between the conductors 8 and 10 is transduced to a frequency component by means of a transducer which is illustrated as comprising an inverter 26 having terminals 22 and 24 to which the buses 8 and 10 are connected, the inverter circuit 26 may be substantially that disclosed in U.S. Pat. No. 2,783,384 which issued in the name of R. L. Bright et al on Feb. 26, 1957. In accordance with the teachings of the Bright et al patent, the frequency of the output potential at the output terminals 28 and 30 will be proportional to the voltage supplied to the conductors 8 and 10 and thereby proportional to the current flowing in the conductor 16 and related to the current in conductor 2 as shown in FIG. 2.

A pair of oscillators 32 and 32A operated at different frequencies are connected to be energized with energy obtained from the conductor 2. For this purpose there is provided a transformer 34 coupled to the conductor 2. Its output winding 36 is connected to energize through the output terminals 38 and 42 through a rectifier and supplies power to the oscillator 32. Similarly the other half of the winding 36 is connected to the output terminals 40 and 42 through another rectifier to supply power to the oscillator 32A. As will be described in greater detail below, the oscillators 32 and 32A will conduct during opposite half cycles of the current in the line 2. Each of the half cycles will be at a slightly different frequency whereby the transmitted signal will provide intelligence information concerning current phase as well as magnitude. The transmitted information or intelligence is transmitted without pulse delay. Zener diodes 44 and 46 are connected respectively between the terminals 38 and 42 and terminals 40 and 42 to determine and limit the voltage supplied to the oscillators 32 and 32A.

The oscillators 32 and 32A are substantially identical and only oscillator 32 will be described in detail. The elements in the oscillator 32A which are the same as in oscillator 32 are identified by the same reference characters with the letter A added. The oscillator 32 includes a transistor 48 and a tank circuit 50 connected in a usual manner to the output terminals 38 and 42 of the power supply. The oscillator 32 is tuned to oscillate at a desired carrier frequency and is amplitude modulated by the output frequency for the inverter 26 which is a function of instantaneous line current. For this purpose its output terminals 28 and 30 are connected to the base emitter circuit of a transistor 64 and coupled portions of the tank circuits 50 and 50A. The output terminals 38 and 40 are connected individually through rectifiers to terminal 56 of the input winding 58 of an impedance coupling device which is illustrated as comprising an inductive device or transformer 60. The other terminal 62 of the winding 58 is connected through the collector-emitter the transistor 64 and through a portion of the tank circuit 50A to the negative common power supply terminal 42.

During one half cycle of the current in the conductor 2, a positive to negative potential will be established between the output terminals 38 and 42 whereby power will be supplied to the oscillator 32 which will then oscillate at a frequency as determined by the tank circuit 50 and modulated by the output frequency of the inverter 26. During this half cycle substantially no power will be supplied to the oscillator 32A due to the absence of collector voltage so that the oscillator 32A will not oscillate. During the other half cycle of the current in the conductor 2, a positive to negative potential will be maintained between the output terminals 40 and 42 whereby the oscillator 32A will oscillate at the frequency established primarily by its tank circuit 50A modulated by the frequency of the inverter 26.

Similarly, the oscillator 32 will not oscillate during the other half cycles. The output winding 66 of transfer 60 has an intermediate of center tap connection 67 connected by conductor 68 to the conductor 2. The electrically spaced end terminals of the winding 66 are connected to the upper end terminals of a pair of coupling capacitors or couplers 69 and 70. The lower end terminals of these couplers 69 and 70 are connected to the electrically spaced end terminals of a center tapped winding 72 of an impedance coupling device which is illustrated as comprising an inductive device or transformer 74. The intermediate or center tap terminal 76 is connected to earth or ground 4.

The transformer 74 is provided with an output winding 78 having its end terminals connected to an amplifier and demodulator 80 for supplying the transmitted information or intelligence thereto. The demodulator 80 may be of any conventional construction in which the signals supplied thereto by the winding 78 will be amplified, detected, squared, and clipped to provide a square wave output at its pairs of output terminals 82 and 84 in response to the operation of the transmitters 32 and 32A respectively. The square wave output signal from the pair of output terminals 82 is supplied to the input winding 85 of a square-loop saturating type iron core transformer 86 having a secondary winding 88. The output of the winding 88 represents a substantially constant magnitude output signal for each half cycle of the signal applied to the winding 85. This output signal is rectified in the full wave rectifying network 89 and the rectified result is applied between the input terminals 90 and 91 of a constant input resistance type of smoothing filter 92 which is composed of a (1) resistive-inductive and (2) a resistive-capacitive circuit in parallel and (3) a resistor the value of its resistance being equal to the square root of the ratio between the value of the inductance and the value of the capacitance of the first and second networks. This network provides a reasonably constant effective resistance which prevents the reflection of an otherwise varying impedance to the saturating iron core. The output of the network 92 is supplied to an amplifier 94 which amplifies the signals supplied to the desired meters and instruments (not shown).

The network 94A connected to the output terminal 84 is similar to the network 94 connected to the output terminal 82 and includes a square-loop saturating type iron core transformer 86A a full wave rectifying bridge or network 89A and a filter 92A connected to the amplifier 94 in parallel with the filter 92. The filters 92 and 92A which prevent transients from being reflected into the core have their magnitudes kept to a minimum to prevent the introductions of an undue time delay. The above filter as described would give approximately an 18° delay to the voltage circuits. Undelayed phase information is available to the demodulator as a frequency shift signal.

The carrier frequency of the oscillators 32 and 32A may be desired. The output frequency of the inverter or transducer 26 may have a range of from 0 to 3 kilohertz in the range of from 0 percent to 100 percent of rated current in the conductor 2 and may have a range of 3 to 6 kilohertz in the range of from 100 percent to 2000 percent of the rated current in the conductor 2. Under these conditions a square wave output of from 0.3 to 3.0 kilohertz would have good accuracy and from 3.0–6.0 kilohertz would have fair accuracy. Since currents below 10 percent of the rated current of the conductor 2 are of a little interest in connection with a high voltage power line which even at open line conditions have a charging current which is substantially greater than 10 percent of the rated line current. The output of the filters 92 and 92A supply the amplifier 94 with a signal which is proportional to the current in line 2 and may be used safely at earth potentials for supplying a signal to meters and instruments.

As indicated in FIG. 2 the region below 3 kilohertz is compressed for relaying purposes and is accomplished by changing resistance at the 100 percent level whereby at that time one circuit goes up and the compensating circuit goes down.

FIG. 3 shows a modified form of the invention in which similar elements are identified by the same reference characters, but at numbers 100 higher than those used in FIG. 1. In the embodiment of FIG. 3, the secondary winding of the current transformer 106 has its end terminals connected to energize a pair of conductors or buses 109 and 110 between which have a resistor 116 connected therebetween and which have a pair of back to back arranged Zener Diodes 118 and 118A connected in series with a resistor 120 to limit the voltage to which the buses 108 and 110 may be raised by the current through conductor 102. The bus 110 is connected to one input terminal 122 of a voltage to current transducer or inverter 126 and the bus 108 is connected in series with the output terminals 128 and 130 of the transducer 126 to the collector of transistor 96. The emitter of transistor 96 is connected to the center tap terminal 97 of the arc winding 98 forming a part of a tank circuit 99 is connected to the base of the transistor 96 and the other terminal is connected to the input terminal 124 of the transducer 126.

Power for the tank circuit 99 is supplied from a transformer 134 similar to the transformer 34. The winding 98 serves as the primary winding of the output transformer 160 which has the end terminals its output winding 166 connected to the top end terminals of the coupling capacitors 169 and 170 and its center tap connection connected by conductor 168 to the conductor 102. The lower end terminals of the coupling capacitors 169 and 170 are connected to the end terminals of the transformer winding 172. The center tap terminal 176 is connected to earth or ground 104. This connection if desired may include in series an inductance and a capacitor.

Figure 4:
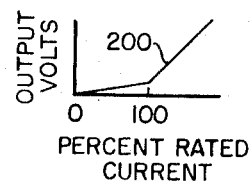
FIGS. 4 and 5 are curves showing the voltage current relationship at the two outputs of the apparatus of FIG. 3.
Figure 5:
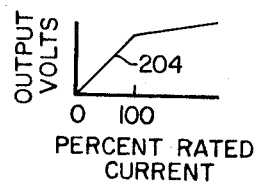

The winding 178 of transformer 174 is connected to the input terminals of an amplifier and discriminator 180. The device 180 includes a frequency modulation discriminator circuit with a center frequency of zero output corresponding to the output frequency of circuit 126 at zero voltage between the busses 108 and 110. The output is connected to the input terminals 190 and 191 of a pair of filters 192 and 193. In relaying it is desirable to have a relatively small change in output voltage in the lower current range and the filter 192 is arranged to compress the changes in the lower current range as indicated by the curve 200 of FIG. 4. The output voltage of filter 192 is applied to the input of an amplifier 202 the output of which is supplied to suitable of relaying circuitry (not shown). The network 193 compresses the region above 100 percent rated current which may produce a three kilocycle output frequency as indicated by the curve 204 of FIG. 5. The output of the network 193 is applied to an amplifier 206 which may be used to energize indicating instruments and other meters (not shown) as desired.

In the event coupling capacitors are not used to interconnect the end terminals of the windings 66 and 72 of the transformers 60 and 74 two strings of suspension type insulators may be used to provide the communicating channel for the frequency modulated intelligence which passes from the transmitter at the high potential of the transmission line to the receivers at nearly ground potential.

What is claimed and is desired to be secured by United States Letters Patent is as follows:

1. Apparatus for transmitting intelligence between two potential levels comprising first and second couplers, each of said couplers including first and second end terminals capacitively coupled together, first and second impedance coupling devices, each of said impedance coupling devices having a first pair of electrically spaced terminals and an intermediate terminal, first means coupling said intermediate terminal of said first device to said potential at a first of said levels, second means coupling said intermediate terminal of said second device to said potential at the second of said levels, third means coupling said spaced terminals of said first device to said first end terminals, fourth means coupling said spaced terminals of said second device to said second end terminals, intelligence transmitting means coupled to said first device to supply an intelligence signal thereto, and an intelligence receiving means coupled to said second device to receive said intelligence signal transmitted through said couplers.

2. The combination of claim 1 in which each said coupler includes a plurality of series connected capacitive devices.

3. The combination of claim 1 in which each said coupler comprises a plurality of series connected suspension insulators.

4. The combination of claim 1 in which said intelligence transmitting means includes a current to frequency transducer and a transmitter, said transducer having an input connected to be energized as a function of the current in a conductor at said first potential level and an output coupled to said transmitter, and means coupling said transmitter to said conductor for the supply of energy to said transmitter from said conductor.

5. The combination of claim 4 in which said conductor is energized with alternating current, said transmitter includes first and second oscillators, said first oscillator being rendered effective during the first half-cycles of one polarity and said second oscillator being rendered effective during second half cycles of a second polarity.

6. The combination of claim 5 in which the rendering of said oscillators effective is controlled by said means which supplies energy to said transmitter from said conductor.

7. The combination of claim 5 in which said oscillators transmit signals at different frequencies whereby current directions in said conductor is transmitted without phase delay.

8. The combination of claim 1 in which each said impedance coupling device is inductive in nature and includes winding means, said spaced terminals being connected to said winding means at spaced portions thereof and said intermediate terminal being connected to said winding means intermediate said spaced portions.

9. The combination of claim 8 in which said intermediate terminal is equally spaced inductively from each of said end terminals.

10. The combination of claim 9 in which each said inductive device includes a second pair of spaced terminals connected to said winding means, said transmitting means being coupled between said second pair of spaced terminals of said first inductive device, and said receiving means being coupled between said second pair of spaced terminals of said second inductive device.

11. The combinations of claim 10 in which the portion of said winding means of each said impedance device to which its second pair of spaced terminals is connected is conductively isolated from and inductively coupled to the portion of said winding means of the respective said impedance device to which its said first pair of spaced terminals is connected.

12. In a relaying system for an alternating potential power transmission line having a current conductor at a potential difference with respect to ground, a pair of couplers, each of said couplers including first and second terminals capacitively coupled together, first and second transformers, each of said transformers having a first winding portion including a first pair of end terminals and an intermediate terminal and a second winding portion including a second pair of end terminals, means coupling said intermediate terminal of said first transformer to said conductor, means coupling said intermediate terminal of said second transformer to ground, means coupling said first pair of end terminals of said first transformer between said first terminals of said couplers and said first pair of end terminals of said second transformer between said second terminals of said couplers, an intelligence transmitter having input and output circuits, means coupling said output circuit of said transmitter to said second pair of end terminals of said winding portion of said first transformer, an intelligence sensing transducer coupling said input circuit to said conductor whereby said transmitter is enabled to transmit intelligence derived from said line to said second transformer through said couplers, an intelligence receiver having input and output connections, and means coupling said input connection of said receiver to said end terminals of said second winding portion of said second transformer whereby said receiver is operable to energize its output connection with a signal representative of said derived intelligence.

* * * * *